Jan. 16, 1968 J. F. MIFSUD ET AL 3,363,720
SEISMIC VIBRATOR

Filed Nov. 17, 1966 3 Sheets-Sheet 1

Frank N. Tullos  Charldan C. Hanan
Joseph F. Mifsud  Franklin L. Chalmers INVENTORS BY John B Davidson
ATTORNEY Joseph F. Mifsud
Franklin L. Chalmers
Frank N. Tullos
Charldan C. Hanan   INVENTORS.

BY John D. Gassett
ATTORNEY

Jan. 16, 1968 　　　J. F. MIFSUD ETAL　　　3,363,720
SEISMIC VIBRATOR

Filed Nov. 17, 1966　　　　　　　　　　　　　　3 Sheets-Sheet 3

Frank N. Tullos　Charldan C. Hanan
Joseph F. Mifsud　Franklin L. Chalmers　INVENTORS BY John B. Davidson
ATTORNEY

United States Patent Office 3,363,720
Patented Jan. 16, 1968

3,363,720
SEISMIC VIBRATOR
Joseph F. Mifsud, Franklin L. Chalmers, Frank N. Tullos, and Charldan C. Hanan, Houston, Tex., assignors to Esso Production Research Company, a corporation of Delaware
Continuation-in-part of application Ser. No. 356,268, Mar. 31, 1964. This application Nov. 17, 1966, Ser. No. 607,100
13 Claims. (Cl. 181—.5)

ABSTRACT OF THE DISCLOSURE

In a hydraulic vibrator driven by an electrical signal for imparting a seismic signal into the ground, a piston is reciprocally mounted in a cylinder and a piston rod rigidly connects the piston with an earth coupling plate. Resilient means supports the cylinder from the coupling plate. A reaction mass is rigidly connected to the cylinder, and the mass of the moving parts of the vibrator is kept small compared to the mass of the cylinder and the reaction mass. Additional means is provided for sealingly connecting one end of the resilient means with the cylinder and the other end with the coupling plate. Preferably, the resilient means comprises a pneumatic spring comprising an elastic tubular member surrounding that part of the piston rod extending from the cylinder.

---

This is a continuation-in-part of application Ser. No. 356,268, filed Mar. 31, 1964, now abandoned, and entitled, "Seismic Prospecting," by Joseph F. Mifsud et al.

This invention relates to vibrators for vibrating the ground. It especially relates to a hydraulic-type vibrator for imparting a seismic signal into the ground.

Recently, the imparting of a seismic signal of a selected function into the earth has become of considerable interest. A method of imparting such a selected signal into the ground is by the use of a vibrating energy source, such as a hydraulic vibrator. A hydraulic vibrator is driven, for example, by an electrical signal representative of the selected input signal.

When using a vibrator to generate a seismic input signal, one of the problems encountered is proper coupling of the vibrator to the ground. If the vibrator is merely set on the ground without the use of weights, and then operated to produce sufficient energy to provide vibration of the surface of the earth, the upward force generated by the vibrator often produces an upward acceleration of the vibrator greater than the acceleration provided by gravity. This causes the vibrator to jump off the surface of the ground.

Briefly, the preferred embodiment of this invention includes a portable hydraulic vibrator which includes a cylinder and a piston reciprocally mounted within the cylinder. A piston rod rigidly connects the piston with a coupling plate. Resilient means support the cylinder from the coupling plate. A reaction mass is rigidly connected to the cylinder. The coupling plate includes a deformable means such as a flexible bag containing a particulate substance. The bag is clamped to the coupling plate. By this arrangement, the mass "$m$" of the moving portions of the vibrator, i.e., the piston, the piston rod, and the coupling plate, are kept small compared to the mass $M$ of the cylinder and the reaction mass. This novel arrangement permits a very high efficiency.

Various objects and a better understanding of the invention can be had from the following description taken in conjunction with the drawing in which.

Figure 1:
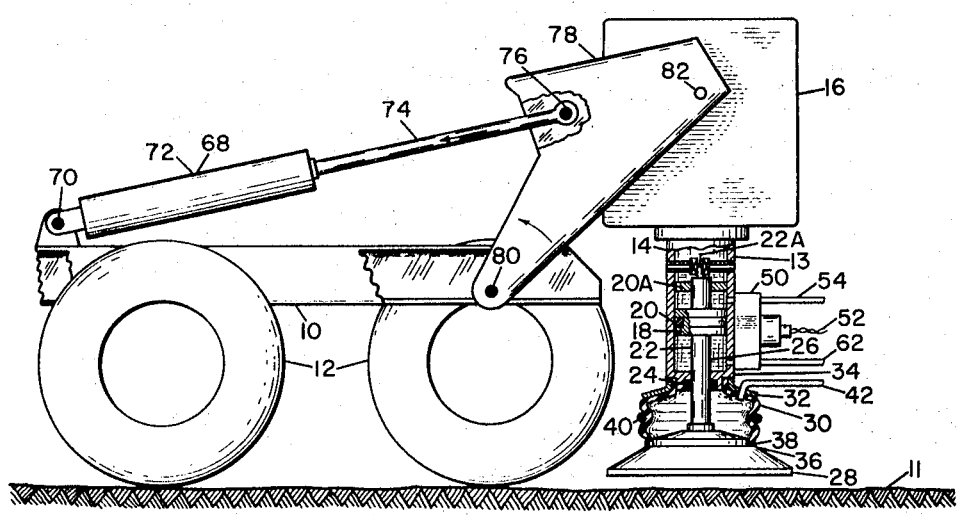
FIG. 1 illustrates a vibrator mounted on the rear end of a truck.

Referring to the drawings, and FIG. 1 in particular, there is illustrated a truck having a flat bed 10 supported by wheels 12. Shown at the rear of the truck bed 10 and resting just above the ground 11 is a hydraulic vibrator 13 which includes a hydraulic cylinder 14 upon which is securely mounted reaction mass 16. Mounted within hydraulic cylinder 14 is piston 18 having seal rings 20. Piston rod 22 extends through the lower end of cylinder 14. Sealing means 24 in the opening 26 of hydraulic cylinder 14 provides sealing axial movement between piston rod 22 and cylinder 14. Rigidly attached to the lower end of piston rod 22 is coupling plate 28. The reaction mass is attached to the cylinder so that the piston will generate a force which is imparted through coupling plate 28 to the ground. The upper end of piston rod 22 is supported by a bearing member. A small diameter magnetic rod 22A extends upwardly from the upper end of piston rod 22. A differential transformer 23 is supported by support members 25A, 25B extending inwardly from the inner surface of cylinder 14 toward rod 22A. Transformer primary leads 27A and secondary leads 27B extend through support members 25A, 25B to the transformer windings. Rod 22A extends only part way through the windings of transformer 23 so that, when an A.C. signal of suitable frequency (typically 13 kc.) is placed on the primary, the amplitude of the signal from the transformer secondary appearing on leads 27B will vary in accordance with the instantaneous position of rod 22A. Electrical circuit 29, which may comprise cascade-connected demodulator and amplifier, is connected to secondary leads 27B to produce a negative feed-back signal that makes the motion of the coupling plate 28 proportional to the electrical input signal.

Cylinder 14 is supported above coupling plate 28 by a pneumatic spring comprising a flexible fabric 30 such as rubber. The upper end of fabric 30 is sealingly bonded to plate 32 which is rigidly and sealingly attached to cylinder 14 at 34. The lower end of fabric 30 is sealingly bonded to coupling plate 28 at 36. A ring member 38 attached to coupling plate 28 aids in bonding this flexible material thereto.

Located intermediate the ends of fabric 30 is a metallic ring 40 which is used to prevent excessive deformation of fabric 30. As is shown more clearly in FIG. 2, the air spring has an inlet 42 which is connected to an air supply through a flexible tubing member 44 containing gauge 46 and regulator valve 48. A separate valve can be included for bleeding off air from within the pneumatic spring. Means for supplying the optimum air pressure for the pneumatic spring will be discussed hereinafter.

Figure 5:
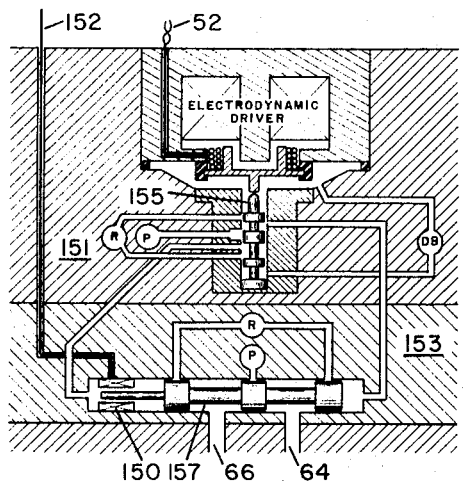
FIG. 5 illustrates the control servo valve for the hydraulic vibrator.

Connected to cylinder 14 is a servo valve 50. A fragmentary sectional view of a suitable servo valve 50 is shown in FIG. 5. It includes pilot stage 151 and power stage 153. Pilot stage 151 is driven by an electrodynamic driver controlled by an input signal on leads 52 to the coil. In the drawing, R indicates return, P indicates pressure, and DB indicates drain-back. P comes from power conduit 54 of FIG. 2, for example, and R is connected to return conduit 62. Power stage 153 includes slave spool 157 and transducer 150 whose output indicates the position of slave spool 157. The servo valve follows the control signal fed to it through conducting leads 52. Power is supplied to the servo valve through power conduit 54 as is shown more clearly in FIG. 2. Flexible conduit 54 is connected to an accumulator 56 which is connected to the discharge side of pump 58 which obtains its hydraulic fluid from reservoir 60. Fluid from servo valve 50 is returned to reservoir 60 through conduit 62. There are port means 64 and 66 within the wall of cylinder 14, respectively above and below piston 18. Servo valve 50 faithfully follows the signal fed to it through leads 52 so that it adds and removes hydraulic fluid through port means 64 and 66 respectively to and from cylinder 14 above and below vibrator piston 18 in accordance with such control signal. Thus, when coupling plate 28 is on the ground, it imparts a signal to the ground which faithfully follows the control signal fed to the servo valve.

Figure 2:
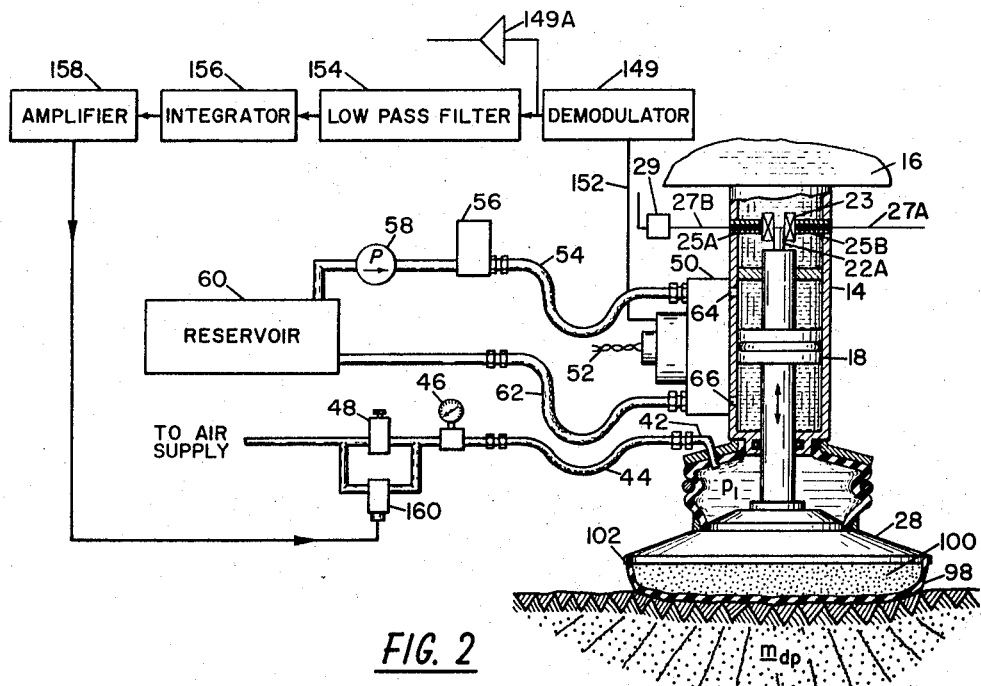
FIG. 2 illustrates additional features of the vibrator of FIG. 1 including a novel coupling means.

After the vibrator is placed on the ground by any of the means hereinafter discussed, the pressure "$p_1$" in the pneumatic spring of FIG. 2 is adjusted to support the weight of the hydraulic cylinder 14 and the reaction mass 16. This is done by increasing the air pressure "$p_1$" until the output of the transducer 150, which is attached to the power or slave spool of the servo valve, indicates that the power spool is in the middle or center position. This center position is indicated when there is no input signal on lead lines 52. It is necessary to have approximately zero hydrostatic pressure in the hydraulic cylinder in order for the hydraulic servo valve to operate in its linear region.

The air pressure "$p_1$" in the pneumatic spring can be adjusted by using the apparatus of FIG. 2, by hand, if desired. Air regulator 48 is opened to permit air to enter into the pneumatic spring until such time as there is zero signal on the leads 152. Alternatively, the pressure "$p_1$" can be adjusted automatically. Leads 152 from transducer 150 are connected to a demodulator 149 whose output is fed to a low pass filter 154. The output of low pass filter 154 is fed to an integrator 156 and the output of integrator 156 is fed to amplifier 158. A signal from amplifier 158 opens normally closed solenoid valve 160 to permit air to flow therethrough into the pneumatic spring. When the servo slave valve is in the center portion, transducer 150 has zero output and the amplifier 158 will have no output; thus, valve 160 will be closed. When the virbator is placed on the ground, the slave valve will always be off center in one direction if there is insufficient pressure on the pneumatic spring because of the downward force on the reaction mass.

Attention is now directed toward that part of the mechanism of FIG. 1 for raising and lowering the vibrator and the reaction mass 16. It includes hydraulic ram 68 which obtains its power from a suitable, conventional power source, not shown, and is controlled by a suitable conventional control means, also not shown. Hydraulic ram 68 includes housing 72 and extension arm 74. Housing 72 is mounted to truck frame 10 at pivot 70. Extension arm 74 is connected to axle 76. A pair of lifting arms 78 are connected to axle 76. The lifting arms are pivoted at one end 80 to the truck bed 10 and the other end through pivot 82 to reaction mass 16.

When it is desired to lift the reaction mass 16 and the attached vibrator, all that is required is to control the fluid to hydraulic ram 68 so that member 74 is drawn into housing 72. This pulls arms 78 upwardly into a counterclockwise rotation about pivot 80 and lifts reaction mass 16 and the vibrator to lower the reaction. The vibrator is lowered by operating hydraulic ram 68 such that member 74 is extended outwardly so that arms 78 rotate about pivots 80.

Figure 3:
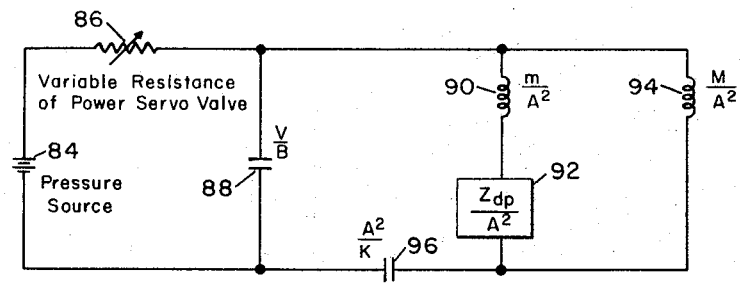
FIG. 3 illustrates an electrical circuit "equivalent" to the mechanical arrangement of the hydraulic ground vibrator of FIG. 1.

Attention is now directed to FIG. 3 which shows an electrical equivalent to the hydraulic ground vibrator of FIG. 1. In this diagram, voltage is analogous to pressure; current is analogous to rate of volume flow; inductance is analogous to mass; and capacitance is analogous to compliance. Symbols used in the drawings have the following meanings:

$V$=volume of hydraulic fluid in the cylinder
$A$=effective area of the piston exposed to fluid pressure
$B$=bulk modulus of the hydraulic fluid
$m$=mass of the moving parts including the hydraulic piston and coupling plate
$Z_{dp}$=driving point impedance of the ground
$M$=includes mass of the hydraulic cylinder and reaction mass
$K$=force constant of the pneumatic spring.

The hydraulic power supply is represented as battery 84. Variable resistance 86 regulates the flow of current similar to the way the power servo valve 50 regulates the flow of hydraulic fluid. However, for simplicity, the reversal of fluid flow is not shown by the electrical circuit. The flow of hydraulic fluid is divided into three parallel branches. The first branch includes a condenser 88 having a capacity $V/B$, which is the compliance for the fluid in the hydraulic cylinder 14. The second branch includes the impedance 90 of the coupling plate and the hydraulic piston, in series with the driving point impedance 92 of the ground. The impedance of the coupling plate and hydraulic piston is indicated by $m/A^2$. The driving point impedance of the ground is indicated as $Z_{dp}/A^2$. The third parallel branch is due to the inertia of the reaction mass indicated at 94 as $M/A^2$. The sum of the hydraulic flow associated with the motion of the hydraulic piston and the reaction mass passes through the condenser 96 which has a capacity $A^2/K$ and is indicative of the compliance of the pneumatic spring supporting the hydraulic cylinder and reaction mass 16 above the coupling plate 28.

The unique design of the vibrator of this invention permits most of the available hydraulic flow of fluid provided by the hydraulic supply to the servo valve to be used to move the ground. This is accomplished by making the compliance of the oil in the hydraulic cylinder 14 small and the inertia of the reaction mass 16 large compared to the sum of the impedance of the hydraulic piston 18, of the coupling plate 28, of the piston rod 22, and of the driving point impedance of the ground.

The main reason for having the reaction mass large compared to the moving mass is to use the oil which flows through the hydraulic valve 50 to move the ground and not to move the reaction mass. The efficiency of the system is based on what percentage of the fluid flow through the valve is used to move the ground.

The driving point impedance of the ground is given by the following equation:

$$Z_{dp} = R_{dp} + i\left(\omega m_{dp} - \frac{K_{dp}}{\omega}\right)$$

where $R_{dp}$ is the radiation resistance, and $K_{dp}$ is the force constant of the ground, and $m_{dp}$ is the mass of the ground moving with the coupling plate.

An efficient design means that the impedance of the reaction mass is made as large as possible compared to the sum of the impedances of the moving mass (piston plus coupling plate) and the driving point impedance of the ground. At low frequencies the driving point impedance of the ground is essentially that of a very stiff spring. At high frequencies the driving point impedance of the ground is simply the inertia of several hundred pounds. Thus, at high frequencies the efficiency of the system is roughly the ratio of the reaction mass 16 divided by the reaction mass 16 plus the mass of the moving parts which include piston 18, piston rod 22, coupling plate 28, and that part of the ground which is moved. To maintain an efficiency of about 80%, which is about the lower limit of desired efficiency, the mass of the coupling plate is made small and the reaction mass is made large, roughly 10 times that of the moving mass, i.e., the mass of the piston, the coupling plate and the mass of the ground moving with the coupling plate.

Making the resonance frequency of the stiffness of the hydraulic fluid in the cylinder and the moving mass as high as possible extends the useful frequency band of the vibrator. In other words, when the vibrator is driven at a frequency higher than such resonance frequency, the amplitude of the vibrator falls off very sharply. This resonant frequency ($f_r$) is $$f_r = \frac{1}{2\pi}\sqrt{\frac{K}{m+m_{dp}}}$$

where, as indicated in FIG. 2, $m_{dp}$ is that part of the ground moving with the coupling plate 28. Thus, the resonant frequency is inversely proportional to the moving mass. This resonant frequency is kept high by keeping $m$ small. The mass $m$ is kept small by connecting the reaction mass to the cylinder and not to the piston. A further factor in keeping the resonant frequency high is to maintain the stiffness $B/V$ of the hydraulic fluid in the hydraulic cylinder as large as possible.

By rigidly connecting the cylinder to the reaction mass and connecting the piston to the coupling plate, the reaction mass can readily be made very large in comparison to the coupling mass. This permits, as shown above, (A) a larger output of energy into the earth, particularly at the higher frequencies and provides for (B) a very efficient design so that the flow of hydraulic fluid through the servo valve 50 is used to move the ground and not displace the heavy reaction mass.

Also shown in FIG. 2 is a novel manner of constructing the coupling means. It includes coupling plate 28 similarly as in FIG. 1, but it also includes a flexible bag 98 filled with a particulate substance 100 such as sand. The bag is clamped at the bottom edge of coupling plate 28 with a strap 102.

The advantages of this coupling system are quite significant. For example: (1) It provides good contact over the whole area of the coupling plate, which means there is good radiation of elastic energy. There are no high points of contact made between the coupling plate and ground. (2) The coupling is consistent at essentially any point where the vibrator is placed and a signal can be repeated from location to location. (3) A particulate medium such as sand is deformable and also possesses rigidity which is necessary for good coupling. (4) As a vibrator can be loaded more uniformly over the surface of the coupling plate, there is less wear on the vibrator bearing, where the rod, for example, goes through the walls of the cylinder.

Figure 4:
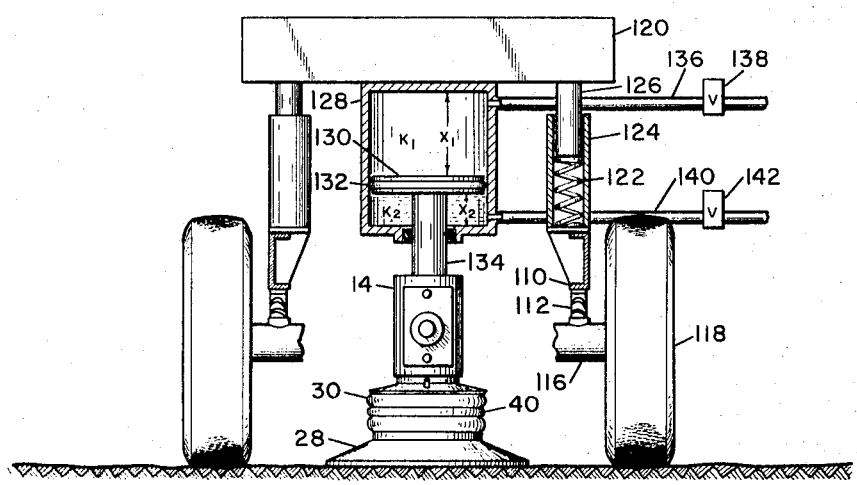
FIG. 4 illustrates another means of mounting the vibrator of this invention on a supporting vehicle.

FIG. 4 illustrates another novel manner of supporting a vibrator system from a truck. Shown thereon is a truck frame 110 supported through leaf springs 112 from axle 116 upon which wheels 118 are mounted. Also shown in FIG. 4 are plate 28, cylinder 14, and pneumatic spring 30 of the vibrator assembly similarly as shown in FIG. 1.

Also shown in FIG. 4 is reaction mass 120. The reaction mass is supported from frame 110 through spring 122 which is held by guide 124, which is secured to frame 110. Secured to the lower side of reaction mass 120 and extending downward are rods 126 which slidingly fit on top of springs 122 in guides 124.

Attention is next directed to that portion of the apparatus of FIG. 4 for raising and lowering the hydraulic vibrator from the ground and also for effectively connecting reaction mass 120 to the cylinder housing during operation of the vibrator. Connected to the lower side of reaction mass 120 is cylinder 128. Mounted in cylinder 128 is piston 130, having sealing means 132. A piston rod 134 is secured to piston 130 and sealingly and slidingly extends through the lower end of cylinder 128. The lower end of piston rod 134 is rigidly connected to cylinder 14 of the vibrator.

Hydraulic fluid is injected into and withdrawn from the interior of cylinder 128 above piston 130 through conduit 136 having valve 138. Likewise, hydraulic fluid is injected into and withdrawn from cylinder 128 below piston 130 through conduit 140, having valve 142. The power for the hydraulic fluid can be obtained from power source 58, for example, of FIG. 2, which is the same source used for driving the vibrator.

When it is desired to raise the vibrator from the ground, hydraulic fluid is injected through conduit 140 and at the same time fluid is withdrawn through conduit 136. This forces piston 130 upward in the cylinder. Piston 130 is rigidly connected to cylinder 14 of the vibrator so the vibrator is likewise lifted. When the vibrator is raised off the ground, the weight of the vibrator and the reaction mass 120, as well as cylinder 128, is carried through springs 122 to truck frame 110. When it is desired to operate the tool, the vibrator is lowered to the ground by removing fluid from the lower side of piston 132 and adding hydraulic fluid to the upper side. When the vibrator touches the ground, additional fluid is still removed from the lower side and additional fluid is injected to the upper side until essentially all of the weight of reaction mass 120 is supported through the fluid above piston 130 to housing 14 of the vibrator. At this time, of course, springs 132 are supporting essentially none of the weight of the reaction mass, and the reaction mass is more or less completely isolated from the truck body itself. Thus, any resonant frequencies of the truck are of no importance.

The size of cylinder 128 and piston 130 and the length of the stroke—that is, $x_1$ plus $x_2$ of FIG. 4 within the cylinder 128—are such that there is in effect a rigid coupling between the reaction mass and the vibrator throughout the seismic range of frequencies, which, for example, normally is between about 10 and 100 cycles per second. Attention is now directed as to how this is accomplished in this invention.

Generally, the following formula shows the stiffness of connection between two masses interconnected by a hydraulic cylinder and piston, $$K = \frac{BA}{L}$$

where, $B$=bulk modulus of the hydraulic fluid
$A$=area of cross section of the cylinder
$L$=effective length of the volume.

In the device of FIG. 4, then the effective stiffness ($K_{eff}$) is given by $$K_{eff} = K_1 + K_2 = BA\left(\frac{1}{x_1} + \frac{1}{x_2}\right)$$

The vibrator is preferably designed such that $x_2$ should be able to vary from approximately 1 inch to about 6 inches to compensate for variation in the ground level—that is, the ground upon which the vibrator rests being higher or lower than the ground upon which the wheels rest. The area of cross section of cylinder 128 and the bulk modulus of the hydraulic fluid are selected so that for the maximum value of $x_2$, which in this example is 6 inches, an effective rigid connection between reaction mass 120 and the cylinder 14 of the vibrator is provided. If $x_2$ equals 6 inches and $x_1$ equals 12 inches, then the following equation can be written:

$$K = BA\left(\frac{1}{12} + \frac{1}{6}\right) = \frac{BA}{4}$$

Let $f_r$, the resonant frequency of the reaction mass 120 and the compliance of the fluid in cylinder 128 be, for example, 100 cycles per second, which is the upper limit of the range of frequencies of interest for seismic prospecting in the example. If a seismic frequency higher than 100 cycles per second is desired then $f_r$ would be higher.

The following applies:

$$\omega_r^2 = \frac{K}{M}$$

and substituting from the above equation $$\omega_r^2 = \frac{BA}{4M}$$

where $\omega_r$, the radian frequency, $= 2\pi f_r$.

The bulk modulus for a good grade hydraulic fluid can be approximately 200,000 p.s.i.

M is selected to be a value sufficient to hold the vibrator cylinder 14 firmly against the ground. In this example, M can conveniently be 10,000 pounds similarly as shown in regard to FIG. 1.

$\omega_r^2$ is equal to $4\pi^2 10^4$ where the upper limit of the seismic frequency is set at 100 in the example.

Substituting, one gets:

$$4^2 \pi 10^4 = \frac{200,000 \pi r^2 \times 32 \times 12}{4 \times 10,000}$$

where 32 is $g$, the gravitational acceleration, and 12 is inches per foot, which are used to obtain correct units.

Solving the equation for $r$, the radius of the cylinder 128, one gets 8 inches. Thus, in the example given in which cylinder 128 has a radium of 8 inches, the hydraulic fluid used has a bulk modulus of 200,000 p.s.i. and $x_2$ is not over six inches, the reaction mass is effectively rigidly coupled to cylinder 14 of the vibrator.

Figure 6:
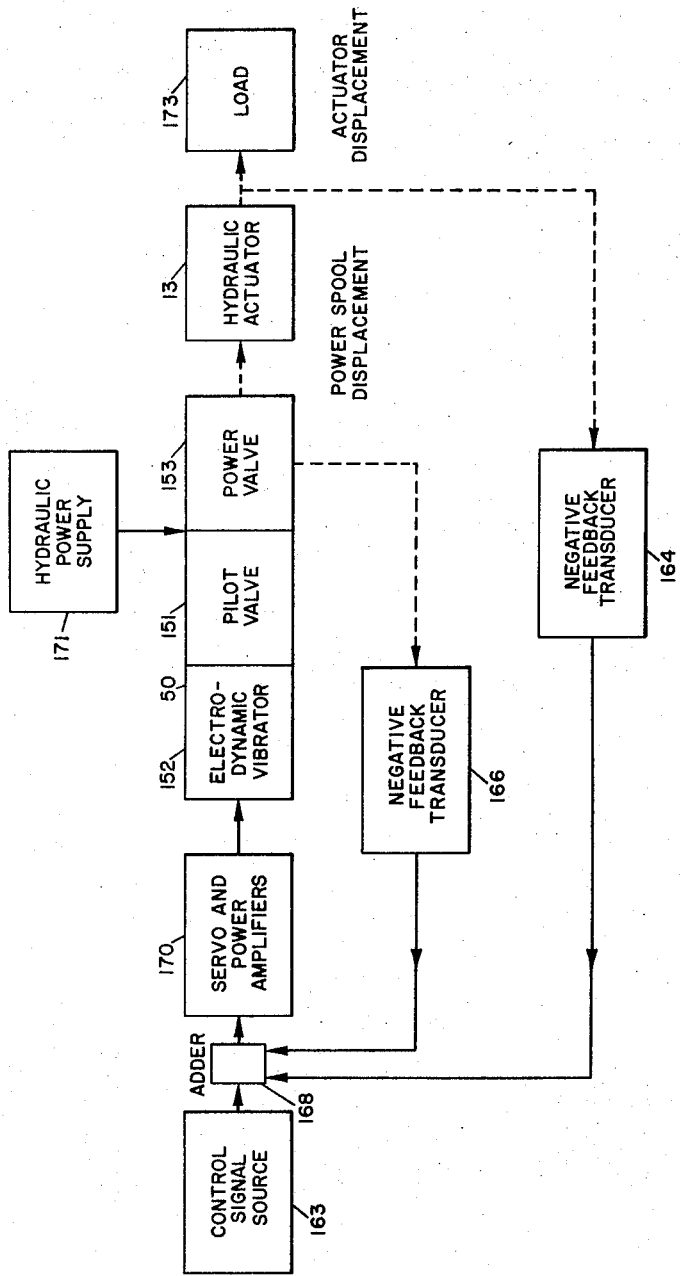
FIG. 6 is a block schematic diagram of the vibrator of FIGS. 1 and 2 and control elements therefor.

With reference now to FIG. 6, there is illustrated a block diagram, partially mechanical and partially electrical, of the apparatus described above, along with certain additional circuit elements for controlling the physical operation of the vibrator. The hydraulic power supply 171 includes reservoir 60, conduits 54, 62, pump 58, and accumulator 56 of FIG. 2. The servo valve 50, including electrodynamic vibrator 122, pilot valve 150, and power valve 153, and the hydraulic actuator 13 are shown as appropriately connected blocks. The actuator 113 is connected to a load 173, which may be considered as the coupling plate and the earth. The hydraulic actuator also is connected to a negative feed-back transducer 164 which, as mentioned above, comprises the transformer 23 and circuit 29. A feed-back transducer 166, which comprises the differential transformer 150 and demodulator 149 and a phase-reversing amplifier 149A (see FIG. 2), is connected to the power valve 153. The electrical output signals from transducers 166 and 164 are applied to an adder circuit 168 where they are added or combined with the electrical control signal from source 163. Adder circuit 168 may be a conventional adding amplifier. The control signal from source 163 may be a swept frequency signal or a pseudo-random signal such as a constant frequency electrical signal variable in time duration or phase in accordance with a binary code of maximal length. The sum signal from adding circuit 168 is applied to servo and power amplifiers 170 to produce a signal for controlling vibrator 152.

The over-all operation of the apparatus described above is as follows. Assume that a suitable control signal that varies as a function of time is applied to adder 168 from source 163 for the purpose of driving hydraulic actuator 13 at a given amplitude for injection of a seismic signal in the earth at a predetermined amplitude. The velocity of the fluid through the power valve will change as a function of frequency due to the impedance of the valve, and the velocity of the hydraulic actuator would change were it not for the action of feed-back transducer 166. As soon as the transducer detects such an unwanted change, the output signal thereof will change so as to vary the input signal to amplifiers 170 and thus regulate the power valve to bring the velocity of movement of the piston of actuator 13 back to the desired value as controlled by the output signal from signal source 163. Furthermore, it is known that the impedance of the earth varies with changes in the frequency of vibration of an earth vibrator. Should the frequency of the control signal be varied, the amplitude of the seismic wave will vary were it not for the action of transducer 164. When the amplitude of movement of actuator 13 changes, the amplitude of the output signal of transducer 164 will vary to produce a compensating change in the output signal of adding circuit 168 that will restore the amplitude of movement of piston 18 to the value controlled by source 163. When the apparatus is first activated it will be necessary to carefully adjust the output signals of transducers 164 and 166, as by varying the gain of the phase-reversing amplifiers associated therewith or by other means well known to the art. This is in accordance with techniques well known to servo amplifier technology and need not be further discussed herein. Thereafter, the apparatus may be moved from place to place on the surface of the earth without the necessity of making further adjustments on a routine basis and with confidence that the amplitude of the signal injected into the earth at various locations will be of substantially the same amplitude, and the amplitude of vibration as a function of frequency is automatically controlled.

While there are disclosed above but a limited number of embodiments of the system of the invention herein presented, it is possible to produce still other embodiments without departing from the inventive concept herein disclosed. It is therefore desired that only such limitations be imposed on the appended claims as are stated therein.

What is claimed is:

1. An apparatus for imparting seismic energy into the ground for mounting on a frame of a vehicle which comprises in combination:
   a first cylinder;
   a first piston reciprocally mounted within said first cylinder;
   first means to selectively add fluid under pressure to opposite sides of said first piston within said first cylinder;
   a coupling plate adapted to rest upon the earth;
   a first piston rod rigidly connecting said first piston to said coupling plate;
   first resilient means supporting said first cylinder from said coupling plate;
   a reaction mass;
   a second cylinder rigidly connected to the lower side of said reaction mass;
   a second piston mounted within said second cylinder;
   a second piston rod rigidly connecting said second piston with said first cylinder; and
   second means to selectively add fluid under pressure to opposite sides of said second piston within said second cylinder.

2. An apparatus as defined in claim 1 including second means to resiliently support said reaction mass from the frame of said vehicle when said second piston is in its uppermost position in said second cylinder.

3. An apparatus as defined in claim 1 wherein the mass M of the first hydraulic cylinder, the second cylinder, the second piston and the reaction mass is at least about ten times the sum of the masses of said first piston and said coupling plate and the mass of the ground moving with the coupling plate.

4. An apparatus as defined in claim 2 in which the first resilient means is a pneumatic spring means comprising:
   an elastic sleeve member surrounding that part of the piston rod extending from said first cylinder; and
   means sealingly connecting one end of said elastic sleeve member with said first cylinder and the other end with said coupling plate.

5. An apparatus as defined in claim 4 including means to add and remove fluid from the interior of said elastic sleeve member.

6. An apparatus as defined in claim 5 including coupling means for coupling said coupling plate to the ground which comprises:

a flexible membrane placed beneath said coupling plate and secured thereto at its periphery and forming an enclosed space between said coupling plate and said flexible membrane; and a particulate substance within said enclosed space.

7. In a hydraulic vibrator having a coupling plate adapted to contact a surface to be vibrated, the improved coupling means which comprises:

a flexible membrane placed on the side of said coupling plate adjacent said surface;

means connecting said membrane to said coupling plate in a manner to form an enclosure beneath said coupling plate; and a substance consisting essentially of a particulate material disposed within and filling said enclosure.

8. An apparatus for imparting seismic energy into the ground which comprises in combination:

a vertically disposed cylinder;

a piston reciprocally mounted within said cylinder;

first means to selectively add fluid under pressure to opposite sides of said piston within said cylinder;

a coupling plate adapted to rest upon the earth;

a piston rod rigidly connecting said piston with said coupling plate;

a reaction mass rigidly connected to said cylinder, the mass of said reaction mass and said cylinder being substantially larger than the mass of said coupling plate, said piston and said piston rod; and pneumatic spring means adapted to support said cylinder and said reaction mass above and from said coupling plate, said pneumatic spring means comprising an elastic tubular member surrounding that part of said piston rod extending from said cylinder, and means sealingly connecting one end of said elastic tubular member with said cylinder and the other end with said coupling plate.

9. An apparatus as defined in claim 8 including a flexible bag-like member filled with a substance consisting essentially of a particulate material, said flexible bag-like member being attached to the surface of said coupling plate which is adapted to rest upon the earth.

10. The apparatus of claim 8 wherein said first means includes means including signal generating means for controlling the velocity at which said fluid under pressure is added to opposite sides of said piston, feed-back transducer means connected to said piston for producing an electrical output signal variable in amplitude in accordance with the position of said piston and having a phase opposite to the phase of the output signal of said signal generating means, and adding circuit means for combining the output signals of said signal generating means and said feed-back transducer means.

11. The apparatus of claim 10 wherein said feed-back transducer means comprises an elongated ferromagnetic means connected to said piston for movement therewith, differential transformer means having a primary winding and a secondary winding in magnetic relationship with said ferromagnetic means whereby the magnetic coupling between said windings varies with the position of said piston, A.C. source means connected to said primary winding, and circuit means including demodulator means for producing an alternating signal indicative of the amplitude of the signal across said secondary winding, and phase-reversing amplifier means for reversing the phase of the signal from said demodulator means.

12. The apparatus of claim 10 further including second means connected to said first means to produce a signal indicative of the velocity of fluid added to opposite sides of said piston, and means connected to said second means and to said adding circuit means for reversing the phase of said signal for combination with the output signals of said signal generating means and said feed-back transducer means by said adding circuit means.

13. The apparatus of claim 12 further including a pneumatic source, electrically actuated valve means connecting said pneumatic spring means to said pneumatic source, and means for integrating the output signal of said first means to produce a control signal indicative of the average value of the output signal of said first means for actuation of said valve means when said control signal reaches a given magnitude.

References Cited

UNITED STATES PATENTS 3,282,372   11/1966   Brown et al. _____ 18—5

BENJAMIN A. BORCHELT, *Primary Examiner.*

G. H. GLANZMAN, *Assistant Examiner.*